(12) United States Patent
Leiphon et al.

(10) Patent No.: US 10,582,181 B2
(45) Date of Patent: Mar. 3, 2020

(54) PANORAMIC VISION SYSTEM WITH PARALLAX MITIGATION

(71) Applicant: HONEYWELL INTERNATIONAL INC., Morris Plains, NJ (US)

(72) Inventors: Ken Leiphon, Phoenix, AZ (US); William Ray Hancock, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/936,533

(22) Filed: Mar. 27, 2018

(65) Prior Publication Data

US 2019/0306484 A1 Oct. 3, 2019

(51) Int. Cl.
*H04N 13/128* (2018.01)
*H04N 13/239* (2018.01)
(Continued)

(52) U.S. Cl.
CPC ....... *H04N 13/128* (2018.05); *H04N 5/23238* (2013.01); *H04N 13/332* (2018.05);
(Continued)

(58) Field of Classification Search
CPC ........ G02B 2027/0138; G02B 27/0172; G02B 2027/0178; G02B 27/017; G02B 13/06;
(Continued)

(56) References Cited

U.S. PATENT DOCUMENTS 9,098,248 B2 * 8/2015 Suzuki ................. G06F 1/1626
9,378,702 B2 * 6/2016 Chen ..................... G06F 1/1607
(Continued)

FOREIGN PATENT DOCUMENTS

EP 1954029 A1 8/2008
EP 2631728 A2 8/2013
(Continued)

OTHER PUBLICATIONS

Moffitt, Kirk, "Head-Mounted Display Image Configurations," Reaearch Gate, May 2008.

*Primary Examiner* — Dave Czekaj
*Assistant Examiner* — Kehinde Abimbola
(74) *Attorney, Agent, or Firm* — Lorenz & Kopf, LLP

(57) ABSTRACT

A panoramic image system with parallax mitigation includes image sensors, a head tracker, a display, and a processor. Each image sensor is fixedly mounted a predetermined linear distance from a first reference axis and is disposed adjacent to at least one other image sensor and to point in a direction that is offset from its adjacent image sensor by a predetermined angle. The head tracker is configured to sense at least the angular position and movement direction of a viewer's head about a second reference axis and to supply an azimuth position signal representative thereof. The display is configured to selectively display images sensed by each of the image sensors. The processor is in operable communication with the image sensors, head tracker, and display. The processor is configured, based at least on the azimuth position signal, to command the display to display images sensed by only one image sensor.

12 Claims, 4 Drawing Sheets

(51) Int. Cl.
*H04N 13/332* (2018.01)
*H04N 13/371* (2018.01)
*H04N 13/38* (2018.01)
*H04N 13/398* (2018.01)
*H04N 13/232* (2018.01)
*H04N 5/232* (2006.01)

(52) U.S. Cl.
CPC ........... *H04N 13/371* (2018.05); *H04N 13/38* (2018.05); *H04N 13/398* (2018.05); *H04N 2213/001* (2013.01)

(58) Field of Classification Search
CPC ...... G02B 2027/014; G02B 2027/0187; G02B 27/0093; H04N 5/23293; H04N 5/2254; H04N 5/44; H04N 5/23238; H04N 13/344; H04N 13/398; H04N 7/181
See application file for complete search history.

(56) References Cited

U.S. PATENT DOCUMENTS

| | | | |
|---|---|---|---|
| 10,165,182 B1* | 12/2018 | Chen | H04N 5/2252 |
| 2007/0097206 A1* | 5/2007 | Houvener | G03B 35/08 348/26 |
| 2009/0066814 A1* | 3/2009 | Miyata | H04N 5/23203 348/231.99 |
| 2012/0154518 A1* | 6/2012 | Zargarpour | G03B 17/565 348/36 |
| 2012/0154519 A1* | 6/2012 | Zargarpour | G03B 17/565 348/36 |
| 2012/0155786 A1* | 6/2012 | Zargarpour | G03B 35/08 382/284 |
| 2015/0348497 A1* | 12/2015 | Chen | G06F 1/1607 345/1.1 |
| 2015/0373268 A1 | 12/2015 | Osborne | |
| 2016/0119610 A1* | 4/2016 | Houvener | G03B 35/08 348/36 |
| 2016/0142632 A1 | 5/2016 | Lyon et al. | |
| 2018/0315364 A1* | 11/2018 | Yamamoto | G02B 27/02 |

FOREIGN PATENT DOCUMENTS

| | | |
|---|---|---|
| EP | 3065406 A1 | 9/2016 |
| EP | 3177010 A1 | 6/2017 |
| JP | 2010256534 A | 11/2010 |
| WO | 2017168347 A1 | 10/2017 |

\* cited by examiner

PANORAMIC VISION SYSTEM WITH PARALLAX MITIGATION

STATEMENT REGARDING FEDERALLY SPONSORED RESEARCH OR DEVELOPMENT

This invention was made with Government support under Contract No.: D15PC00077 awarded by the Defense Advanced Research Projects Agency ("DARPA"). The Government has certain rights in the invention.

TECHNICAL FIELD

The present invention generally relates to panoramic vision systems, and more particularly relates to a panoramic vision system with parallax mitigation.

BACKGROUND

Various techniques are known for extending the field of view (FOV) of a camera. One technique is to mount a plurality of cameras on circular or semi-circular mount structure to implement what is sometimes referred to as a camera ring. A camera ring allows for a panoramic view with much less "fish-eye" distortion and higher resolution than a single camera. With a camera ring, the individual cameras each produce images that overlap, and the overlapping images are then stitched together to produce a single, expanded FOV image.

Various techniques are also used to implement the image stitching. The most accurate technique is to generate depth fields and then apply the video images captured by the cameras as textures overlaying the depth fields. Although this technique is fairly accurate, the processing time associated with generating the depth fields results in excessive latency for real-time applications, such as driving a vehicle with indirect vision.

As may be appreciated, when implementing a camera ring, a technique is also used to transition between the cameras. One relatively simple technique is to simply switch between cameras at about the center of the angle between the two cameras. This has the advantage of low latency, but causes a rather pronounced "jump" in the scene due to parallax difference.

Hence, there is a need for a system and method for transitioning between cameras on a camera ring that eliminates, or at least significantly mitigates, parallax differences, and that does not rely on processing techniques that exhibit relatively excessive latency. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a panoramic image system with parallax mitigation includes a plurality of image sensors, a head tracker, a display, and a processor. Each image sensor is fixedly mounted a predetermined linear distance from a first reference axis and is disposed adjacent to at least one other image sensor. Each image sensor is disposed to point in a direction that is offset from its adjacent image sensor by a predetermined angle. The head tracker is configured to sense at least the angular position and the movement direction of a viewer's head about a second reference axis and to supply an azimuth position signal representative thereof, where the second reference axis is parallel to the first reference axis. The display is configured to selectively display images sensed by each of the image sensors. The processor is in operable communication with each of the image sensors, with the head tracker, and with the display. The processor is configured, based at least on the azimuth position signal, to command the display to display images sensed by only one of the image sensors.

In another embodiment, a panoramic image system with parallax mitigation includes a first image sensor, a second image sensor, a third image sensor, a head tracker, a near-to-eye display, and a processor. The first image sensor is fixedly mounted a predetermined linear distance from a first reference axis and is disposed to point in a first direction. The second image sensor is fixedly mounted the predetermined linear distance from the first reference axis and is disposed to point in a second direction, where the second direction is a predetermined angular magnitude in a first rotational direction about the reference axis. The third image sensor is fixedly mounted the predetermined linear distance from the first reference axis and is disposed to point in a third direction, where the third direction is the predetermined angular magnitude in a second rotational direction about the reference axis. The head tracker is configured to sense at least the angular position and the movement direction of a viewer's head about a second reference axis and to supply an azimuth position signal representative thereof, where the second reference axis is parallel to the first reference axis. The near-to-eye display is configured to selectively display images sensed by each of the image sensors. The processor is in operable communication with each of the image sensors, with the head tracker, and with the near-to-eye display. The processor is configured, based at least on the azimuth position signal, to command the near-to-eye display to display images sensed by only one of the image sensors.

In yet another embodiment, a panoramic image system with parallax mitigation includes a first image sensor, a second image sensor, a third image sensor, a head tracker, a near-to-eye display, and a processor. The first image sensor is fixedly mounted a predetermined linear distance from a first reference axis and is disposed to point in a first direction. The second image sensor is fixedly mounted the predetermined linear distance from the first reference axis and is disposed to point in a second direction, where the second direction is a predetermined angular magnitude in a first rotational direction about the reference axis. The third image sensor is fixedly mounted the predetermined linear distance from the first reference axis and is disposed to point in a third direction, where the third direction is the predetermined angular magnitude in a second rotational direction about the reference axis. The head tracker is configured to sense at least the angular position and the movement direction of a viewer's head about a second reference axis and to supply an azimuth position signal representative thereof, where the second reference axis is parallel to the first reference axis. The near-to-eye display is configured to selectively display images sensed by each of the image sensors. The processor is in operable communication with each of the image sensors, with the head tracker, and with the near-to-eye display. The processor is configured, based at least on the azimuth position signal, to command the near-to-eye display to: (i) display images sensed by only the first image sensor at least when the angular position of the viewer's head, relative to the first direction, is between a first predetermined snap angle and a second predetermined snap angle, wherein the first and second predetermined snap angles are less than the predetermined angular magnitude, (ii) display images sensed by only the second image sensor at least when the angular position of the viewer's head is greater than the first predetermined snap angle, and (iii) display images sensed by only the third image sensor at least when the angular position of the viewer's head is greater than the second predetermined snap angle.

Furthermore, other desirable features and characteristics of the panoramic image system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
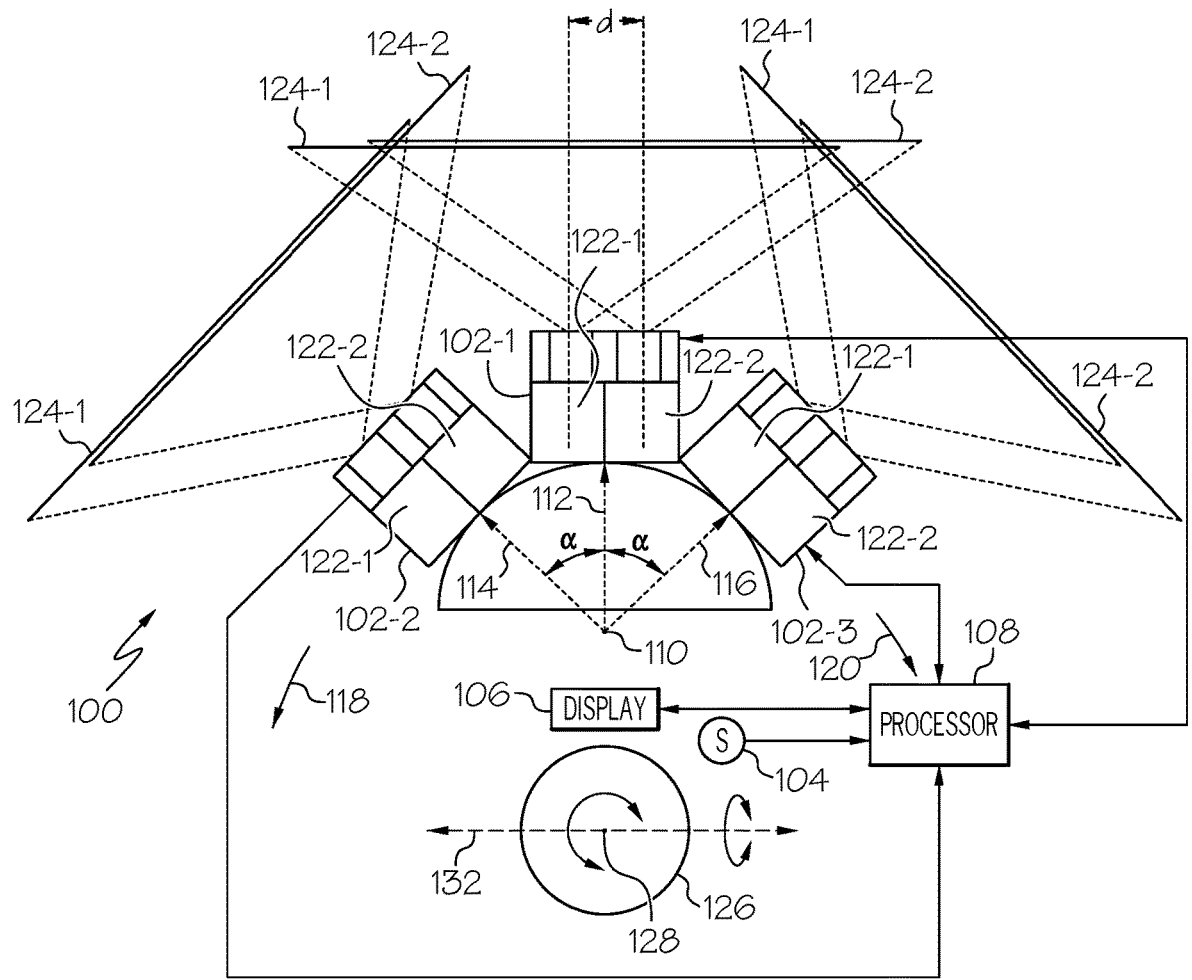
FIG. 1 depicts a functional block diagram of a panoramic image system with parallax mitigation.

Referring to FIG. 1, a panoramic image system 100 with parallax mitigation is depicted and includes at least a plurality of image sensors 102 (102-1, 102-2, 102-3 ... 102-N), a head tracker 104, a display 106, and a processor 108. Each image sensor 102 is fixedly mounted a predetermined linear distance from a first reference axis 110, and is disposed adjacent to at least one other image sensor 102. In the depicted embodiment, each image sensor 102 is fixedly mounted to a camera ring mount structure 114 that, at least in the depicted embodiment, is semi-circular in cross-section. It will be appreciated that in other embodiments, the camera ring mount structure 114 could be less than semi-circular in cross-section, circular in cross-section, or between semi-circular and circular in cross-section.

Regardless of the specific cross-section shape of the camera ring mount structure 114, each image sensor 102 is disposed to point in a direction that is offset from its adjacent image sensor 102 by a predetermined angular magnitude ($\alpha$). It will be appreciated that the predetermined angular magnitude ($\alpha$) may vary, and may be determined based, for example, on the number of image sensors 102 included in the system 100. In the depicted embodiment, the system 100 is implemented with three image sensors 102—a first image sensor 102-1, a second image sensor 102-2, and a third image sensor 102-3.

The first image sensor 102-1 is fixedly mounted a predetermined linear distance ($d_1$) from a first reference axis 110 and is disposed to point in a first direction 112. The second image sensor 102-2 and the third image sensor 102-3 are also fixedly mounted the predetermined linear distance from the first reference axis 110. However, the second image sensor 102-2 is disposed to point in a second direction 114 and the third image sensor 102-3 is disposed to point in a third direction 116. As FIG. 1 illustrates, the second direction is the predetermined angular magnitude ($\alpha$) in a first rotational direction 118 about the reference axis 110, and the third direction is the predetermined angular magnitude ($\alpha$) in a second rotational direction 120 about the reference axis 110. In one particular embodiment, the predetermined angular magnitude ($\alpha$) is 45-degrees.

It will additionally be appreciated that the image sensors 102 may be variously configured and implemented. For example, each image sensor 102 may be implemented using one, two, or three or more image sensing devices. In the depicted embodiment, each of the image sensors 102 comprise a pair of stereoscopic cameras 122—a first camera 122-1 and a second camera 122-2. Preferably, the first and second cameras in each pair 122 are identical, and have identically dimensioned, and partially overlapping, sensor field-of-views (FOVs). For example, each first camera 122-1 has a first FOV 124-1, and each second camera 122-2 has a second FOV 124-2 that is equal to the first FOV 124-1. Although the FOV of each camera may vary, in one particular physical implementation, the first and second FOVs 124-1, 124-2 each have a horizontal FOV (HFOV) of 76-degrees and a vertical FOV (VFOV) of 61-degrees. As may be appreciated, the horizontal and vertical FOVs can vary.

As may be appreciated, because the stereoscopic camera pairs 122 that comprise each image sensor 102 are separated by a predetermined separation distance (d), the first and second FOVs 124-1, 124-2 are not fully coextensive. The predetermined separation distance (d) may vary. In one particular embodiment, however, the predetermined separation distance (d) is about 2.5-inches (or 63.5 mm), which corresponds to around the mean interpupillary distance (IPD) for human males. It will be appreciated that the predetermined separation distance (d) may vary, and may, in some embodiments, be adjustable to a longer or shorter separation distance.

The head tracker 104 is configured to sense at least the angular position and movement direction of a viewer's head 126 about a second reference axis 128 that is parallel to the first reference axis 110. The head tracker 104 is configured, in response to movement about the second reference axis 128, to supply an azimuth position signal representative thereof to the processor 108. The head tracker 104 may also be further configured, in at least some embodiments, to sense the angular position and movement direction of the viewer's head 126 about a third reference axis 132 that is perpendicular to both the first and second reference axes 110, 128. The head tracker 104, when configured to do so, is further configured, in response to movement about the third reference axis 132, to supply an elevation position signal representative thereof to the processor 108. The head tracker 104 may be implemented using any one of numerous known sensing devices for sensing the azimuthal and/or elevational position of a viewer's head 126. Some non-limiting examples include inertial measurement units (IMUs), magnetic head trackers, optical head trackers, and various combinations thereof.

The display 106 is configured to selectively display images sensed by each of the image sensors 102. More specifically, and as will be described further below, the display is responsive to commands from the processor 108 to display images from only one of the image sensors 102. The display 106 may be implemented using any one of numerous known display types, such as a near-to-eye (NTE) display or a forward looking display that scans around a plurality of images using conventional controls. In one particular embodiment, the display 106 is implemented using a NTE display, such as a head-worn device that is configured similar to a pair of goggles or glasses. The display 106 also has a FOV. Although the FOV of the display 106 may vary, it is typically smaller and narrower than the FOV of the cameras 122. For example, in the embodiment in which the first and second sensor FOVs 124-1, 124-2 each have a horizontal FOV (HFOV) of 76-degrees and a vertical FOV (VFOV) of 61-degrees, this same implementation uses a NTE display 106 that has a HFOV of 20-degrees and a VFOV of 27-degrees. Thus, in this embodiment, while the cameras implement landscape type FOVs, the NTE display 106 implements a portrait type FOV. It will be appreciated that in other embodiments the cameras and NTE display 106 could both implement landscape or portrait type FOVs.

The processor 108 is in operable communication with each of the image sensors 102, with the head tracker 104, and with the NTE display 106. The processor 108, as noted above, receives at least the azimuth position signal from the head tracker 104, and is configured, based at least on the azimuth position signal, to command the NTE display 106 to display images sensed by only one of the image sensors 102. More specifically, when, as in the depicted embodiment, the system 100 is implemented with three image sensors 102-1, 102-2, 102-3, the processor 108, in response to at least on the azimuth position signal, commands the NTE display 106 to display images sensed by only the first image sensor 102-1, by only the second image sensor 102-2, or by only the third image sensor 102-3, based on the rotational angle/azimuthal position of the viewer's head relative to the first direction 112. That rotational angle is referred to herein as the nominal snap angle ($\beta_{nom}$).

The snap angle ($\beta_{nom}$) is the angle at which the scene, displayed in the display 106, snaps from one sensor 102 (e.g., camera pair) to the next adjacent sensor (e.g., camera pair). The snap angle ($\beta_{nom}$) occurs in the overlap region of adjacent sensor FOVs to provide a seamless imagery to the display 106 as the head is panned. The snap minimizes parallax errors associated with displaying images, simultaneously, from two different angles, and includes a predetermined amount of hysteresis. Thus, as will now be described, the system 100 is preferably implemented to include four predetermined snap angles—a first predetermined snap angle ($\beta_1$), a second predetermined snap angle ($\beta_2$), a third predetermined snap angle ($\beta_3$), and a fourth predetermined snap angle ($\beta_4$).

Figure 2:
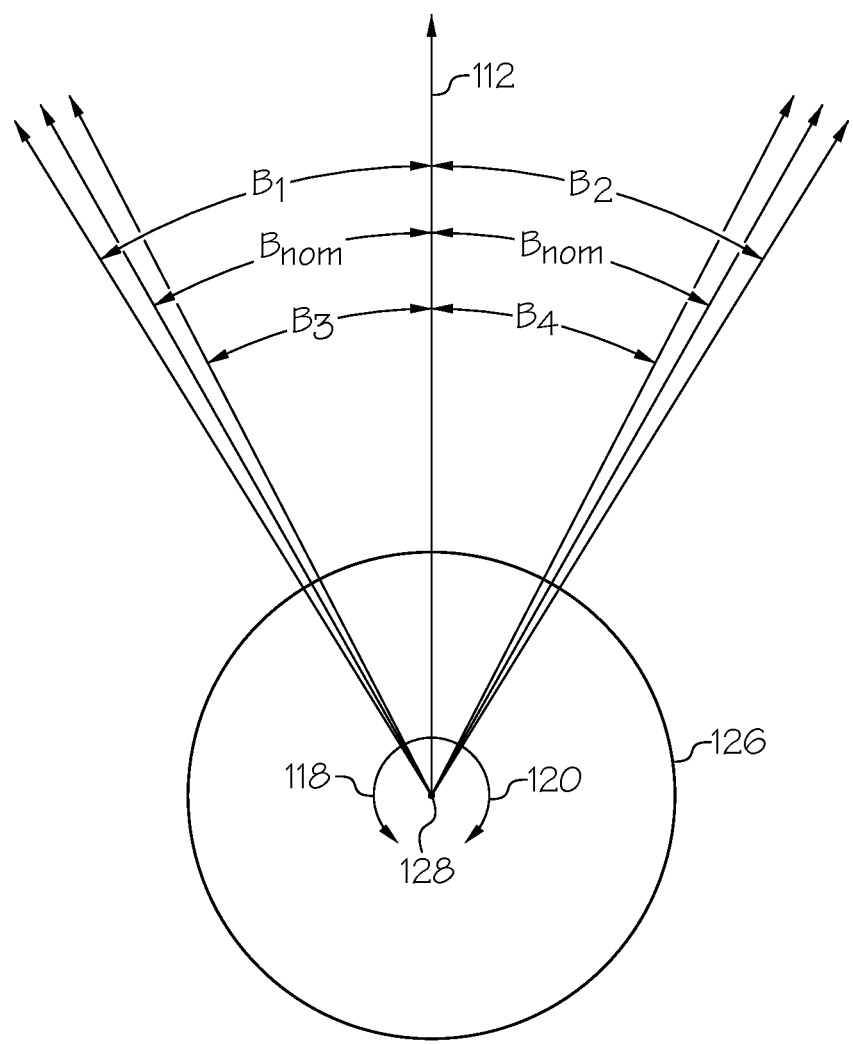
FIG. 2 depicts a simplified representation of a viewer's head and various snap angles that are implemented in the system of FIG. 1.

Referring to FIG. 2, the first predetermined snap angle ($\beta_1$) is a rotational angle/azimuthal position of the viewer's head 126, relative to the first direction 112, in the first rotational direction 118. The second predetermined snap angle ($\beta_2$) is a rotational angle/azimuthal position of the viewer's head 126, relative to the first direction 112, in the second rotational direction 120. The third predetermined snap angle ($\beta_3$) is a rotational angle/azimuthal position of the viewer's head 126, relative to the first direction 112, in the first rotational direction 118. The fourth predetermined snap angle ($\beta_4$) is a rotational angle/azimuthal position of the viewer's head 126, relative to the first direction 112, in the second rotational direction 120.

In view of the foregoing description, the processor 108 is configured to command the NTE display 106 to display images sensed by only the first image sensor 102-1 at least when the rotational position of the viewer's head 126, relative to the first direction 112, is between the first predetermined snap angle ($\beta_1$) and the second predetermined snap angle ($\beta_2$). The processor 108 is additionally configured to command the NTE display 106 to display images sensed by only the second image sensor 102-2 at least when the angular position of the viewer's head 126 is greater than the first predetermined snap angle ($\beta_1$), and to display images sensed by only the third image sensor 102-3 at least when the angular position of the viewer's head 126 is greater than the second predetermined snap angle ($\beta_2$) in the second rotational direction 124.

Because, as noted, the system 100 is implemented to include hysteresis, when the angular position of the viewer's head 126 is greater than the first predetermined snap angle ($\beta_1$) and the viewer's head 126 is rotating in the second rotational direction 120, the processor 108 is configured to command the NTE display 106 to stop displaying images sensed by the second image sensor 102-2 and begin displaying images sensed by only the first image sensor 102-1 only after the angular position of the viewer's head 126 reaches the third predetermined snap angle ($\beta_3$). Similarly, when the angular position of the viewer's head 126 is greater than the second predetermined snap angle ($\beta_2$) and the viewer's head 126 is rotating in the first rotational direction 118, the processor 108 is configured to command the NTE display 106 to stop displaying images sensed by the third image sensor 102-3 and begin displaying images sensed by the first image sensor 102-1 only after the angular position of the viewer's head 126 reaches the fourth predetermined snap angle ($\beta_4$).

It will be appreciated that the relative magnitudes of the first, second, third, and fourth predetermined snap angles may vary. In one particular embodiment, however, the first and second predetermined snap angles ($\beta_1$, $\beta_2$) are equal in magnitude to each other, and are greater in magnitude than the nominal snap angle ($\beta_{nom}$). The third and fourth predetermined snap angles ($\beta_3=\beta_4$) are equal in magnitude to each other, and are less in magnitude than nominal snap angle ($\beta_{nom}$). Additionally, the first and second predetermined snap angles ($\beta_1$, $\beta_2$) are each greater in magnitude than the third and fourth predetermined magnitudes ($\beta_3$, $\beta_4$). It should additionally be noted that the first and second predetermined snap angles ($\beta_1$, $\beta_2$) are each less than the predetermined angular magnitude ($\alpha$).

As mentioned above, in one particular physical implementation, each of the cameras 122 that comprise the image sensors 102 has a horizontal FOV (HFOV) of 76-degrees and a vertical FOV (VFOV) of 61-degrees. Moreover, as was also noted above, the predetermined angular magnitude ($\alpha$) is 45-degrees, which results in a total HFOV of 166 degrees (90+76). With this configuration, the nominal snap angle ($\beta_{nom}$) is +/−22.5-degrees, with +/−2-degrees of hysteresis. Thus, the first predetermined snap angle ($\beta_1$) is 24.5 degrees in the first rotational direction 118, the second predetermined snap angle ($\beta_2$) is 24.5 degrees in the second rotational direction 120, the third predetermined snap angle ($\beta_3$) is 20.5 degrees in the first rotational direction 118, and the fourth predetermined snap angle ($\beta_4$) is 20.5 degrees in the second rotational direction 120.

As was noted above, in some embodiments the head tracker 104 is further configured to sense the angular position and movement direction of the viewer's head 126 about the third reference axis 132. The position about the third reference axis 132 is referred to as the elevation angle of the viewer's head 126, and is used to adjust the predetermined snap angles (β). Ideally, the predetermined snap angles (β) can be optimized based on the distance to the object being viewed. However, the distance to various objects at a given azimuth angle may not (indeed, likely will not) be known. Thus, the approach implemented herein is to optimize the predetermined snap angles (β) at the horizon for 0-degree elevation, and at about 15 feet for −20-degree elevation (e.g., when looking down). The processor 108 then linearly interpolates between the two azimuth offsets between 0- and −20-degrees.

As was noted above, in some embodiments the head tracker 104 is further configured to sense the angular position and movement direction of the viewer's head 126 about the third reference axis 132. The position about the third reference axis 132 is referred to as the elevation angle of the viewer's head 126, and is used to adjust the predetermined snap angles (β) with an offset angle. This offset is then applied to the target snap angle to which the processor is transitioning. Ideally, the predetermined snap angle (β) offset can be optimized based on the distance to the object being viewed at the current elevation angle. However, the distance to various objects at a given azimuth angle may not (indeed, likely will not) be known. Thus, the approach implemented herein is to optimize the predetermined snap angles (β) offset at the horizon for 0-degree elevation, and at about 15 feet for −20-degree elevation (e.g., when looking down and where the distance at −20-degree elevation is based on the height of the sensors 102). The processor 108 then linearly interpolates between the two azimuth offsets between 0 and −20-degrees. The snap angle offsets are clamped at the two extremes (0-degree and −20-degree elevation). In this embodiment, the elevation is effectively used as a first approximation to the distance.

As a non-limiting example, given 0-degrees elevation, an azimuth transition at 24.5-degrees, and a center-to-right transition, the snap will occur at 24.5-degrees, and the right sensor centroid rotation is set to −41.9-degrees instead of −45-degrees (3.1-degrees azimuth offset, which means the camera image rotates left by that angle or the head moved to the right by that amount). For the same transition at −20-degrees of elevation, the right sensor centroid rotates by 46.2-degrees (−1.2 azimuth offset). When moving from the right camera to the center camera at 0-degrees of elevation, if the snap occurs at 20.5 degrees, then the right sensor centroid rotation is changed from 0-degrees to −3.1-degrees (sensor image moves to the right or head to the left). At −20-degrees of elevation, the rotation of the center sensor is 1.2-degrees.

Not only is the processor 108 configured to adjust the first, second, third, and fourth predetermined snap angles based on the elevation position signal, it is also configured, in a least some embodiments, to linearly reduce the adjustments to the first, second, third, and fourth predetermined snap angles based additionally on the azimuth position signal. This is because, even though the snaps between image sensors 102 at the predetermined snap angles was quite clean, there was an offset in the images supplied from the second and third image sensors 102-2, 102-3. It has been found that this offset can be mitigated by linearly bleeding off the offset such that it is dissipated at the center azimuth angle of each of the image sensors 102. If the viewer's head 126 is rotated azimuthally back toward the associated predetermined snap angle without going to the bleed off limit, then the residual angle is adjusted out in the snap back to the other image sensor 102. It will be appreciated that bleed off may be dissipated at an arbitrary angle between the center azimuth and the snap angle, and not just the center azimuth, as in the described embodiment.

Figure 3:
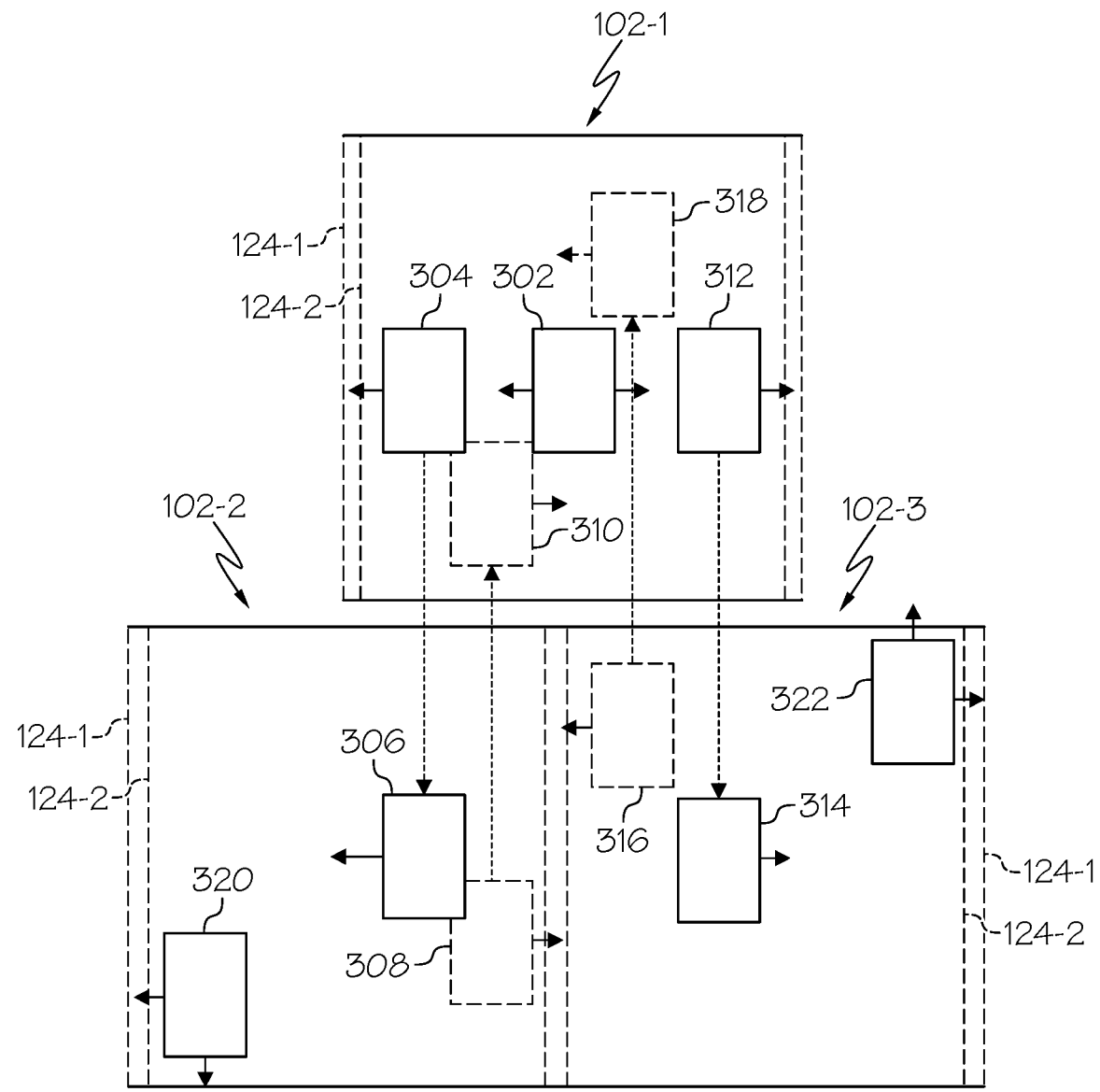
FIG. 3 depicts the field-of-views (FOVs) of a plurality of image sensors in two dimensions.
Figure 3:
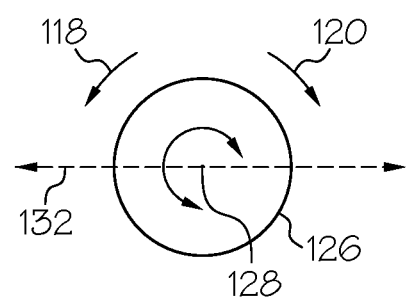
Figure 4:
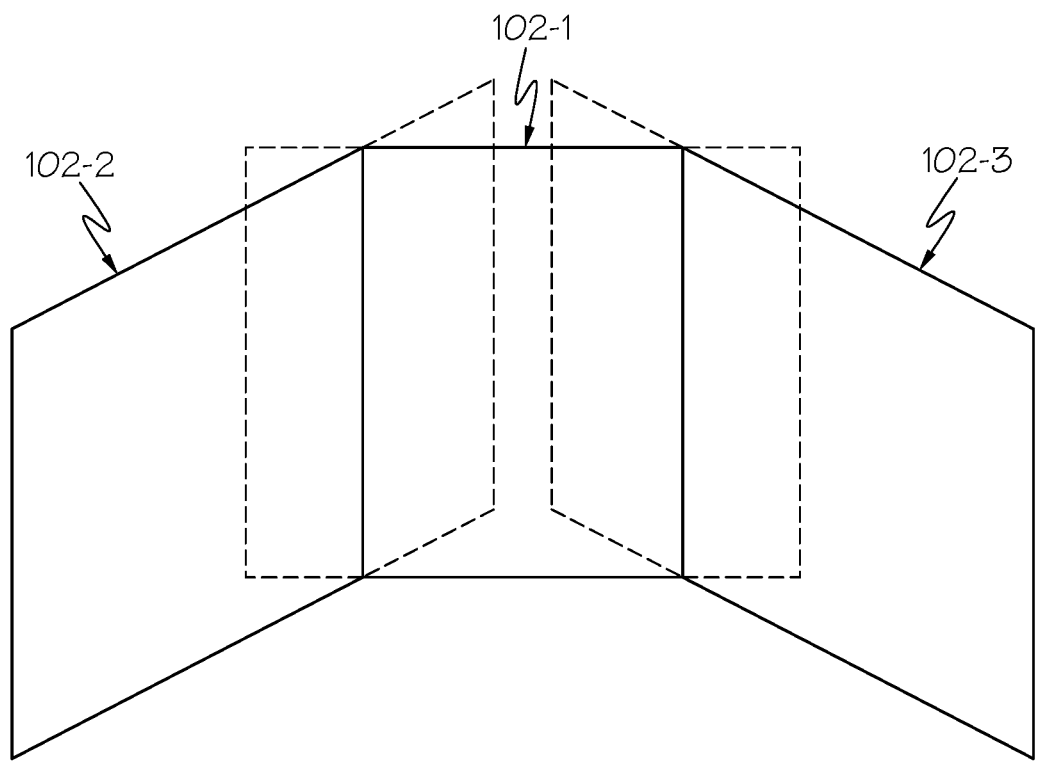
FIG. 4 depicts the field-of-views (FOVs) of the plurality of image sensors in three dimensions.

Turning now to FIG. 3, a more detailed description of the operation of the system 100 will be provided. In doing so, it is noted that, for ease of illustration and description, the FOVs 124 of the first 102-1, second 102-2, and third 102-3 image sensors are depicted in FIG. 3 in two-dimensions, rather than in three-dimensions. For completeness, a representation of the FOVs 124 of the first 102-1, second 102-2, and third 102-3 image sensors in three-dimensions is depicted, in simplified form, in FIG. 4.

Returning now to FIG. 3, it is assumed that the azimuthal position of the viewer's head 126 is initially positioned between the first and second predetermined snap angles ($\beta_1$, $\beta_2$). Thus, the processor 108 commands the NTE display 106 to display images sensed by only the first image sensor 102-1 (i.e., only images within the FOV 124 of the first image sensor 102-1), and such image corresponds to an initial display FOV 302 within the FOV 124 of the first image sensor 102-1. Before proceeding further, it is noted that the initial display FOV 302, and all other display FOVs described hereafter, correspond to the display FOV of the NTE display 106.

With the above initial conditions in mind, if the viewer rotates their head 126 from the initial position (i.e., between the first and second predetermined snap angles ($\beta_1$, $\beta_2$) in the first rotational direction 118, and continues to do so, when the azimuthal position of viewer's head reaches the first predetermined snap angle ($\beta_1$), as represented by display FOV 304, the processor 108 commands the NTE display 106 to display images sensed by only the second image sensor 102-2 (i.e., only images within the FOV 124 of the second image sensor 102-2), as represented by display FOV 306. As long as the azimuthal position of the user's head 126 is greater than the first predetermined snap angle ($\beta_1$), the NTE display 106 will continue displaying images sensed by only the second image sensor 102-2.

If, as depicted in phantom in FIG. 3, the viewer thereafter rotates their head 126 in the second rotational direction 120, and continues to do so, when the azimuthal position of viewer's head 126 reaches the third predetermined snap angle ($\beta_3$), as represented by display FOV 308, the processor 108 commands the NTE display 106 to switch to displaying images sensed by only the first image sensor 102-1 (i.e., only images within the FOV 124 of the second image sensor 102-1), as represented by display FOV 310. Again, as long as the azimuthal position of the user's head 126 is between the first and second predetermined snap angles ($\beta_1$, $\beta_2$), the NTE display 106 will continue displaying images sensed by only the first image sensor 102-1.

Now, it is assumed again that the azimuthal position of the viewer's head 126 is positioned between the first and second predetermined snap angles ($\beta_1$, $\beta_2$), which means the processor 108 commands the NTE display 106 to display images sensed by only the first image sensor 102-1. This again corresponds to the initial display FOV 302 within the FOV 124 of the first image sensor 102-1. If the viewer rotates their head 126 in the second rotational direction 120, and continues to do so, when the azimuthal position of viewer's head 126 reaches the second predetermined snap angle ($\beta_2$), as represented by display FOV 312, the processor 108 commands the NTE display 106 to display images sensed by only the third image sensor 102-3 (i.e., only images within the FOV 124 of the third image sensor 102-3), as represented by display FOV 314. As long as the azimuthal position of the user's head 126 is greater than the second predetermined snap angle ($\beta_2$), the NTE display 106 will continue displaying images sensed by only the third image sensor 102-3.

If, as once again depicted in phantom in FIG. 3, the viewer thereafter rotates their head 126 in the first rotational direction 118, and continues to do so, when the azimuthal position of viewer's head 126 reaches the fourth predetermined snap angle ($\beta_4$), as represented by display FOV 316, the processor 108 commands the NTE display 106 to switch to displaying images sensed by only the first image sensor 102-1 (i.e., only images within the FOV 124 of the first image sensor 102-1), as represented by display FOV 318. Again, as long as the azimuthal position of the user's head 126 is between the first and second predetermined snap angles ($\beta_1$, $\beta_2$), the NTE display 106 will continue displaying images sensed by only the first image sensor 102-1.

Two additional display FOVs 320, 322 are depicted in FIG. 3 and, for completeness, the functionality of the system 100 associated with these display FOVs will now be described. Specifically, one display FOV 320 is depicted approaching the lower-left boundary of the FOV of the second image sensor 102-2, and the other display FOV 322 is depicted approaching the upper-right boundary of the FOV of the third image sensor 102-3. If the azimuthal and/or elevation position of the viewer's head 126 moves beyond the boundaries of the image sensor FOVs 124, the size of the display FOVs 320, 322 (i.e., the FOV of the NTE display 106) is cropped (typically replaced with black).

The system and method described herein provide a relatively dramatic improvement in parallax error mitigation. The system described herein was placed in a window-less vehicle and field tested on a desert course. During the field testing, none of the operators complained about optical discontinuity of the scene as the images transitioned between image sensors (i.e., camera pairs). It is noted that that if the distance to the object is different than the optimized distance, there may be a noticeable jump between two image sensors. That, however, has proven to be a minor issue to the operators.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A panoramic image system with parallax mitigation, the system comprising:
    a first image sensor fixedly mounted a predetermined linear distance from a first reference axis and disposed to point in a first direction;
    a second image sensor fixedly mounted the predetermined linear distance from the first reference axis and disposed to point in a second direction, the second direction being a predetermined angular magnitude in a first rotational direction about the first reference axis;
    a third image sensor fixedly mounted the predetermined linear distance from the first reference axis and disposed to point in a third direction, the third direction being the predetermined angular magnitude in a second rotational direction about the first reference axis;
    a head tracker configured to sense (i) angular position and movement direction of a viewer's head about a second reference axis and to supply an azimuth position signal representative thereof and (ii) angular position and movement direction of the viewer's head about a third reference axis and supply elevation position signals representative thereof, the second reference axis parallel to the first reference axis, the third reference axis perpendicular to the first reference axis and the second reference axis;
    a display configured to selectively display images sensed by each of the image sensors; and
    a processor in operable communication with each of the image sensors, with the head tracker, and with the display, the processor configured, based on the azimuth position signal and the elevation position signal, to command the display to:
        display images sensed by only the first image sensor at least when the angular position of the viewer's head, relative to the first direction, is between a first predetermined snap angle and a second predetermined snap angle;
        display images sensed by only the second image sensor at least when the angular position of the viewer's head is greater than the first predetermined snap angle;
        display images sensed by only the third image sensor at least when the angular position of the viewer's head is greater than the second predetermined snap angle;
        stop displaying images sensed by the second image sensor and begin displaying images sensed by the first image sensor when the viewer's head is rotating in the second rotational direction and the angular position of the viewer's head is (i) at a third predetermined snap angle and (ii) greater than the first predetermined snap angle; and
        stop displaying images sensed by the third image sensor and begin displaying images sensed by the first image sensor when the viewer's head is rotating in the first rotational direction and the angular position of the viewer's head is (i) at a fourth predetermined snap angle and (ii) greater than the second predetermined snap angle, wherein:
the first and second predetermined snap angles are less than the predetermined angular magnitude between the image sensors, and
the processor is further configured to adjust the first, second, third, and fourth predetermined snap angles based on the elevation position signal.

2. The system of claim 1, wherein:
each of the image sensors comprises one or more cameras; and
the display is configured as a near-to-eye display.

3. The system of claim 1, wherein the first predetermined snap angle is equal in magnitude to the second predetermined snap angle.

4. The system of claim 1, wherein:
the third predetermined snap angle and the fourth predetermined snap angle are both less than the first predetermined snap angle; and
the third predetermined snap angle is equal in magnitude to the fourth predetermined snap angle.

5. The system of claim 1, wherein:
the third predetermined snap angle and the fourth predetermined snap angle are both less than the first predetermined snap angle; and
the second predetermined snap angle and the third predetermined snap angle are unequal in magnitude.

6. The system of claim 1, wherein the processor is further configured to reduce the adjustments to the first, second, third, and fourth predetermined snap angles based additionally on the elevation position signal.

7. A panoramic image system with parallax mitigation, the system comprising:
a first image sensor fixedly mounted a predetermined linear distance from a first reference axis and disposed to point in a first direction;
a second image sensor fixedly mounted the predetermined linear distance from the first reference axis and disposed to point in a second direction, the second direction being a predetermined angular magnitude in a first rotational direction about the first reference axis;
a third image sensor fixedly mounted the predetermined linear distance from the first reference axis and disposed to point in a third direction, the third direction being the predetermined angular magnitude in a second rotational direction about the first reference axis;
a head tracker configured to sense (i) angular position and movement direction of a viewer's head about a second reference axis and to supply an azimuth position signal representative thereof and (ii) angular position and movement direction of the viewer's head about a third reference axis and supply elevation position signals representative thereof, the second reference axis parallel to the first reference axis, the third reference axis perpendicular to the first reference axis and the second reference axis;
a near-to-eye display configured to selectively display images sensed by each of the image sensors; and
a processor in operable communication with each of the image sensors, with the head tracker, and with the near-to-eye display, the processor configured, based on the azimuth position signal and the elevation position signal, to command the near-to-eye display to;
display images sensed by only the first image sensor at least when the angular position of the viewer's head, relative to the first direction, is between a first predetermined snap angle and a second predetermined snap angle;
display images sensed by only the second image sensor at least when the angular position of the viewer's head is greater than the first predetermined snap angle;
display images sensed by only the third image sensor at least when the angular position of the viewer's head is greater than the second predetermined snap angle;
stop displaying images sensed by the second image sensor and begin displaying images sensed by the first image sensor when the viewer's head is rotating in the second rotational direction and the angular position of the viewer's head is (i) at a third predetermined snap angle and (ii) greater than the first predetermined snap angle; and
stop displaying images sensed by the third image sensor and begin displaying images sensed by the first image sensor when the viewer's head is rotating in the first rotational direction and the angular position of the viewer's head is (i) at a fourth predetermined snap angle and (ii) greater than the second predetermined snap angle, wherein:
the first and second predetermined snap angles are less than the predetermined angular magnitude between the image sensors, and
the processor is further configured to adjust the first, second, third, and fourth predetermined snap angles based on the elevation position signal.

8. The system of claim 7, wherein each of the image sensors comprises a pair of cameras.

9. The system of claim 7, wherein the first predetermined snap angle is equal in magnitude to the second predetermined snap angle.

10. The system of claim 7, wherein:
the third predetermined snap angle and the fourth predetermined snap angle are both less than the first predetermined snap angle; and
the third predetermined snap angle is equal in magnitude to the fourth predetermined snap angle.

11. The system of claim 7, wherein:
the third predetermined snap angle and the fourth predetermined snap angle are both less than the first predetermined snap angle; and
the second predetermined snap angle and the third predetermined snap angle are unequal in magnitude.

12. The system of claim 7, wherein the processor is further configured to reduce the adjustments to the first, second, third, and fourth predetermined snap angles based additionally on the elevation position signal.

* * * * *